(12) United States Patent
Yasui (10) Patent No.: US 10,298,462 B2
(45) Date of Patent: May 21, 2019

(54) NETWORK FACSIMILE APPARATUS

(71) Applicant: KYOCERA Document Solutions Inc., Osaka-shi, Osaka (JP)

(72) Inventor: Yoshiaki Yasui, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 53 days.

(21) Appl. No.: 15/645,682

(22) Filed: Jul. 10, 2017

(65) Prior Publication Data

US 2018/0019926 A1 Jan. 18, 2018

(30) Foreign Application Priority Data

Jul. 15, 2016 (JP) .................................. 2016-139975

(51) Int. Cl.
*H04L 12/24* (2006.01)
*H04L 29/08* (2006.01)
*H04N 1/00* (2006.01)
*H04N 1/32* (2006.01)

(52) U.S. Cl.
CPC .............. *H04L 41/12* (2013.01); *H04L 67/18* (2013.01); *H04N 1/0022* (2013.01); *H04N 1/00209* (2013.01); *H04N 1/32032* (2013.01); *H04N 1/32122* (2013.01); *H04N 2201/0039* (2013.01); *H04N 2201/0093* (2013.01); *H04N 2201/3208* (2013.01); *H04N 2201/3209* (2013.01)

(58) Field of Classification Search
CPC ..... H04L 41/12; H04L 67/18; H04N 1/00209; H04N 1/0022; H04N 1/32032; H04N 1/32122; H04N 2201/0039; H04N 2201/0093; H04N 2201/3208; H04N 2201/3209

USPC .......................................................... 370/254
See application file for complete search history.

(56) References Cited

U.S. PATENT DOCUMENTS 6,674,745 B1* 1/2004 Schuster ........... H04L 29/06027
370/352
2014/0376377 A1* 12/2014 Mikoda .................. H04W 24/02
370/235

FOREIGN PATENT DOCUMENTS

JP 2008028472 A 2/2008

* cited by examiner

*Primary Examiner* — Chi Tang P Cheng
(74) *Attorney, Agent, or Firm* — Alleman Hall Creasman & Tuttle LLP (57) ABSTRACT

A network facsimile apparatus includes a transmission job accepting portion, a gateway data acquiring portion, a geographical correspondence data acquiring portion, a closest region identifying portion, and a FAX transmission requesting portion. The closest region identifying portion identifies closest geographical information from among a plurality of pieces of geographical information in geographical correspondence data corresponding to area codes of a plurality of gateway line numbers. The closest geographical information indicates a region closest to a region indicated by a piece of geographical information that corresponds to an area code of the destination line number set in the FAX transmission data. The FAX transmission requesting portion transmits the FAX transmission data, via the network, to a FAX gateway to which a gateway address corresponding to the closest geographical information has been assigned, and requests a FAX transmission to be performed via the public line based on the FAX transmission data.

5 Claims, 4 Drawing Sheets

| GATEWAY ADDRESS | GATEWAY LINE NUMBER |
|---|---|
| 111.222.333.111 | 011 111 1111 |
| 111.222.333.112 | 022 222 2222 |
| 111.222.333.113 | 033 333 3333 |

FIG.5

| AREA CODE | GEOGRAPHICAL INFORMATION |
|---|---|
| 011 111 | (11.111 , 111.111) |
| 022 222 | (12.222 , 112.222) |
| 033 333 | (13.333 , 113.333) |

NETWORK FACSIMILE APPARATUS

INCORPORATION BY REFERENCE

This application is based upon and claims the benefit of priority from the corresponding Japanese Patent Application No. 2016-139975 filed on Jul. 15, 2016, the entire contents of which are incorporated herein by reference.

BACKGROUND

The present disclosure relates to a network facsimile apparatus.

In general, upon accepting a transmission job to transmit FAX transmission data in which a destination line number of a public line is set, a network facsimile apparatus acquires a network address corresponding to the destination line number from a SIP (Session Initiation Protocol) server on a network, and transmits the FAX transmission data to another apparatus that corresponds to the acquired network address.

In addition, it is known that a FAX gateway can execute a FAX communication via the public line based on the FAX transmission data, instead of a terminal that does not have a FAX function.

SUMMARY

A network facsimile apparatus according to an aspect of the present disclosure is configured to communicate with a plurality of FAX gateways via a network. The network facsimile apparatus includes a processor that executes a transmission job accepting portion, a gateway data acquiring portion, a geographical correspondence data acquiring portion, a closest region identifying portion, and a FAX transmission requesting portion. The transmission job accepting portion accepts a transmission job to transmit FAX transmission data in which a destination line number of a public line is set. The gateway data acquiring portion acquires gateway data from a nonvolatile storage device, the gateway data including a plurality of pairs of gateway address and gateway line number, the plurality of pairs of gateway address and gateway line number respectively corresponding to the plurality of FAX gateways, the gateway address being a network address of a corresponding one of the plurality of FAX gateways, the gateway line number being a line number of the public line of the corresponding one of the plurality of FAX gateways. The geographical correspondence data acquiring portion acquires geographical correspondence data from the nonvolatile storage device, each piece of the geographical correspondence data indicating a correspondence between geographical information and an area code that constitutes a part of a number of the public line. The closest region identifying portion identifies, as closest geographical information, a piece of the geographical information from among a plurality of pieces of the geographical information in the geographical correspondence data corresponding to area codes of a plurality of gateway line numbers, the closest geographical information indicating a region that is closest to a region indicated by a piece of the geographical information in the geographical correspondence data that corresponds to an area code of the destination line number set in the FAX transmission data. The FAX transmission requesting portion transmits the FAX transmission data, via the network, to a FAX gateway to which a gateway address corresponding to the closest geographical information has been assigned, and requests a FAX transmission to be performed via the public line based on the FAX transmission data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Figure 1:
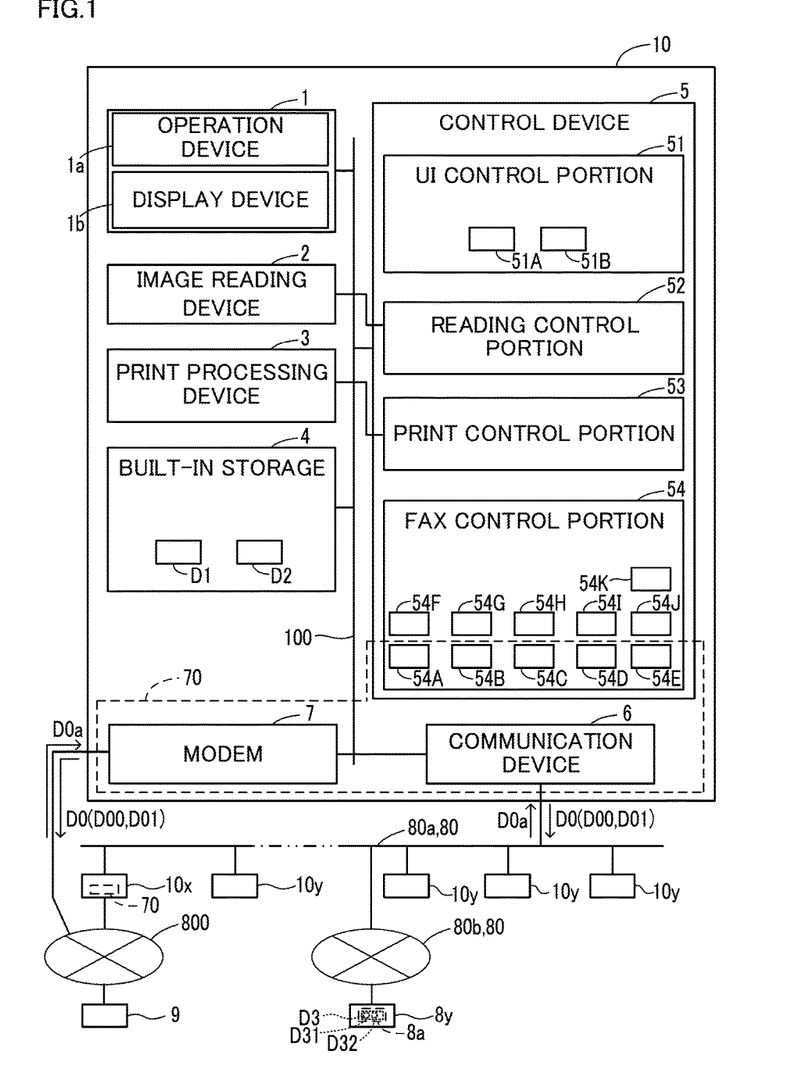
FIG. 1 is a block diagram of an image forming apparatus according to an embodiment of the present disclosure.

The image forming apparatus 10 of the present embodiment is an example of the network facsimile apparatus that executes a FAX communication process via a network 80 which is, for example, a WAN (Wide Area Network) 80a or an internet 80b.

[Configuration of Image Forming Apparatus 10]

As shown in FIG. 1, the image forming apparatus 10 includes a user interface device 1, an image reading device 2, a print processing device 3, a built-in storage 4, a control device 5, a communication device 6, and a modem 7. The user interface device 1 includes an operation device 1a and a panel-like display device 1b, wherein the operation device 1a is composed of a touch panel or push buttons that can receive an operation of a user, and the display device 1b is configured to display information to the user.

The image reading device 2 executes an image reading process to read an image of a document sheet. For example, the image reading device 2 includes a platen glass on which the document sheet is placed, a light source that emits a light beam to the document sheet, a mechanism that moves the light beam along the platen glass, and a line sensor that receives reflection light from the document sheet and outputs image data.

The print processing device 3 executes an image forming process to form an image on a sheet by a predetermined system such as the electrophotographic system or the ink jet system. For example, the print processing device 3 forms an image on the sheet based on image data obtained by the image reading device 2.

The built-in storage 4 is a computer-readable nonvolatile storage device. For example, a hard disk drive or a flash memory is adopted as the built-in storage 4.

The communication device 6 is a communication interface configured to perform a communication with another apparatus via the network 80. In the present embodiment, the other apparatus may be one of the plurality of image forming apparatuses 10 on the WAN 80a other than its associated image forming apparatus 10, or may be a SIP server 8y on the internet 80b.

The SIP server 8y is an information processing apparatus provided with a nonvolatile storage device 8a that stores address management data D3. The address management data D3 includes registered line numbers D31 and registered network addresses D32 that correspond to each other.

The registered line numbers D31 are numbers of a public line 800 assigned to one or more network facsimile apparatuses that are present on the WAN 80a. The registered network addresses D32 are addresses of the network 80 assigned to the one or more network facsimile apparatuses that are present on the WAN 80a.

When initialization is performed, each of the plurality of network facsimile apparatuses including the image forming apparatus 10 transmits, to the SIP server 8y, a number of the public line 800 and an address of the network 80 that have been assigned to that apparatus. The SIP server 8y stores a plurality of pairs of a number of the public line 800 and an address of the network 80 received from the plurality of network facsimile apparatuses, into the storage device 8a as the address management data D3.

Furthermore, in response to a query specifying a number of the public line 800 received from a network facsimile apparatus, the SIP server 8y transmits a registered network address D32 corresponding to the specified number, to the network facsimile apparatus that is the request source.

The modem 7 is a so-called FAX modem, namely, a communication interface configured to transmit FAX transmission data D0 and receive FAX reception data D0a via the public line 800.

The control device 5 performs various calculations, data processing, and control of various electronic devices included in the image forming apparatus 10. The control device 5 is configured to transmit and receive data and control signals to/from the user interface device 1, the built-in storage 4, the communication device 6, and the modem 7 via a bus 100.

The control device 5 includes a UI (User Interface) control portion 51, a reading control portion 52, a print control portion 53, and a FAX control portion 54, wherein the UI control portion 51 controls the user interface device 1, the reading control portion 52 controls the image reading device 2, and the print control portion 53 controls the print processing device 3. The FAX control portion 54 executes a transmission process of transmitting the FAX transmission data D0 and a reception process of receiving the FAX reception data D0a by controlling the communication device 6 or the modem 7.

For example, the control device 5 is implemented by a processor that executes programs stored in advance in the built-in storage 4 or the like. The processor is a MPU (Micro Processor Unit), a DSP (Digital Signal Processor) or the like.

The UI control portion 51 includes a FAX accepting portion 51A. The FAX accepting portion 51A is configured to execute a first transmission job accepting process of accepting a transmission job of transmitting the FAX transmission data D0 in which a destination line number D00 is set.

In the first transmission job accepting process, the FAX accepting portion 51A sets the destination line number D00 based on an operation performed by the user on the operation device 1a, and generates the FAX transmission data D0 that contains, as transmission data D01, image data of the document sheet obtained by the image reading device 2. The destination line number D00 is a number of the public line 800 assigned to the transmission destination of the FAX transmission data D0.

In addition, a job accepting portion 54A of the FAX control portion 54 is configured to execute a second transmission job accepting process of accepting a transmission job of transmitting the FAX transmission data D0. In the second transmission job accepting process, the job accepting portion 54A accepts the transmission job by receiving the FAX transmission data D0 with the destination line number D00 set therein from the other apparatus via the WAN 80a.

It is noted that the FAX accepting portion 51A and the job accepting portion 54A are an example of the transmission job accepting portion, wherein the FAX accepting portion 51A is configured to execute the first transmission job accepting process, and the job accepting portion 54A is configured to execute the second transmission job accepting process.

After the FAX accepting portion 51A accepts a transmission job to transmit the FAX transmission data D0, the FAX control portion 54 executes the FAX transmission process via the communication device 6 or the modem 7.

In a case where the job accepting portion 54A has received the FAX transmission data D0 with the destination line number D00 set therein from the other apparatus, a part of the FAX control portion 54, the communication device 6, and the modem 7 execute a relay process of the FAX transmission via the modem 7. The part of the FAX control portion 54, the communication device 6, and the modem 7 that execute the relay process constitute a FAX gateway 70.

The FAX control portion 54 includes, in addition to the job accepting portion 54A, a registration request transmitting portion 54B, a gateway data registration portion 54C, a FAX line transmission portion 54D, a FAX line reception portion 54E, an address querying portion 54F, a data acquiring portion 54G, a closest region identifying portion 54H, a FAX transmission requesting portion 54I, a FAX network transmission portion 54J, and a FAX network reception portion 54K.

In the present embodiment, the job accepting portion 54A, the registration request transmitting portion 54B, the gateway data registration portion 54C, the FAX line transmission portion 54D, the FAX line reception portion 54E of the FAX control portion 54, the communication device 6, and the modem 7 constitute the FAX gateway 70.

On the other hand, the address querying portion 54F, the data acquiring portion 54G, the closest region identifying portion 54H, the FAX transmission requesting portion 54I, the FAX network transmission portion 54J, and the FAX network reception portion 54K of the FAX control portion 54 function as a network facsimile apparatus that executes a FAX communication via the communication device 6.

Accordingly, in the image forming apparatus 10, the communication device 6 and the modem 7 that constitute a part of the network facsimile apparatus serve as a part of the FAX gateway 70.

The plurality of image forming apparatuses 10 that can communicate with each other via the WAN 80a, include a plurality of first image forming apparatuses 10x and one or more second image forming apparatuses 10y, wherein each of the plurality of first image forming apparatuses 10x includes the FAX gateway 70, and the one or more second image forming apparatuses 10y do not have the function of the FAX gateway 70.

The plurality of first image forming apparatuses 10x are disposed dispersedly in a plurality of regions over the whole communication area of the WAN 80a. It is noted that the FAX gateway 70 included in the first image forming apparatus 10x is one of the plurality of FAX gateways 70 with which the image forming apparatus 10 can communicate via the WAN 80a, and is an example of the built-in FAX gateway.

The second image forming apparatus 10y includes the address querying portion 54F, the data acquiring portion 54G, the closest region identifying portion 54H, the FAX transmission requesting portion 54I, and the FAX network transmission portion 54J, but not the registration request transmitting portion 54B, the gateway data registration portion 54C, the FAX line transmission portion 54D, and the FAX line reception portion 54E that constitute a part of the FAX gateway 70.

It is noted that there may be both a case where the second image forming apparatus 10y includes the job accepting portion 54A, and a case where the second image forming apparatus 10y does not include the job accepting portion 54A. In the case where the second image forming apparatus 10y includes the job accepting portion 54A, the job accepting portion 54A can receive the FAX transmission data D0 with the destination line number D00 set therein, from a terminal apparatus (not shown) such as a personal computer.

In each of the first image forming apparatus 10x and the second image forming apparatus 10y, upon receiving FAX reception data that is the FAX transmission data D0 whose destination is that apparatus, the FAX network reception portion 54K stores the received FAX reception data in the built-in storage 4.

Furthermore, in the case where a received FAX output operation has been performed on the operation device 1a, the print control portion 53 causes the print processing device 3 to execute the process of forming an image on a sheet based on the FAX reception data.

In addition, in the first image forming apparatus 10x, in a case where the modem 7 has received a call signal to its associated apparatus via the public line 800, the FAX line reception portion 54E receives the FAX transmission data D0 as the FAX reception data D0a via the modem 7, and stores the received FAX reception data D0a in the built-in storage 4.

Furthermore, in response to a request received from the other apparatus via the WAN 80a, the FAX line reception portion 54E transmits the FAX reception data D0a stored in the built-in storage 4, to the request source.

Meanwhile, the fee to use the public line 800 in FAX communication increases as the distance between the transmission source and the destination becomes larger. As a result, if the FAX gateway 70 near the image forming apparatus 10 executes a FAX transmission based on FAX transmission data D0 destined to a remote region, an expensive fee is charged for having used the public line 800.

Figure 2:
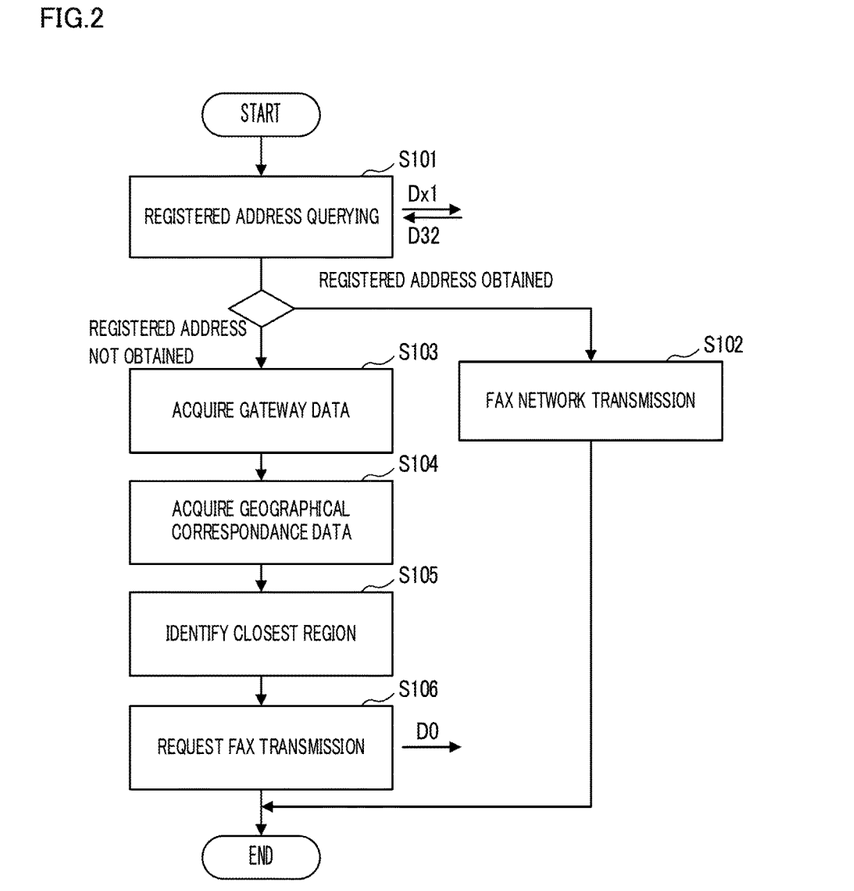
FIG. 2 is a flowchart showing an example of a procedure of a FAX transmission process in the image forming apparatus according to the embodiment.

During a FAX transmission to transmit a FAX by using the public line 800 via the FAX gateway 70, the image forming apparatus 10 executes the FAX transmission process in accordance with the procedure shown in FIG. 2. This makes it possible to reduce the fee to use the public line 800.

[FAX Transmission Process]

In the following, an example of the procedure of the FAX transmission process is described with reference to the flowchart shown in FIG. 2.

In the present embodiment, two cases are considered: a case where the FAX transmission process is executed by the first image forming apparatus 10x in which the FAX gateway 70 is built; and a case where the FAX transmission process is executed by the second image forming apparatuses 10y that does not have the FAX gateway 70.

The FAX transmission process shown in FIG. 2 starts when the FAX accepting portion 51A starts to execute the first transmission job accepting process.

In the following description, S101, S102, . . . are identification signs representing the steps executed by the control device 5 in the FAX transmission process.

<Step S101>

Upon accepting the FAX transmission data D0 in which the destination line number D00 is set, the address querying portion 54F executes a registered address querying process.

In the registered address querying process, a query command Dx1 including a destination line number D00 of the FAX transmission data D0 is transmitted to the SIP server 8y, and a registered network address D32 corresponding to the destination line number D00 is received from the SIP server 8y. The query command Dx1 requests a registered network address D32 corresponding to the destination line number D00. It is noted that the SIP server 8y is an example of the predetermined management server.

When the registered network address D32 is obtained from the SIP server 8y, the address querying portion 54F moves the process to step S102, and when the registered network address D32 is not obtained from the SIP server 8y, the address querying portion 54F moves the process to step S103.

<Step S102>

In step S102, the FAX network transmission portion 54J transmits, via the network 80, the FAX transmission data D0 in which the registered network address D32 obtained from the SIP server 8y is set as the destination.

For example, the FAX network transmission portion 54J transmits the transmission data D01 included in the FAX transmission data D0 to the communication partner apparatus according to the communication protocol SIP or H.323. After completing the process of step S102, the FAX network transmission portion 54J ends the FAX transmission process.

<Step S103>

Figure 4:
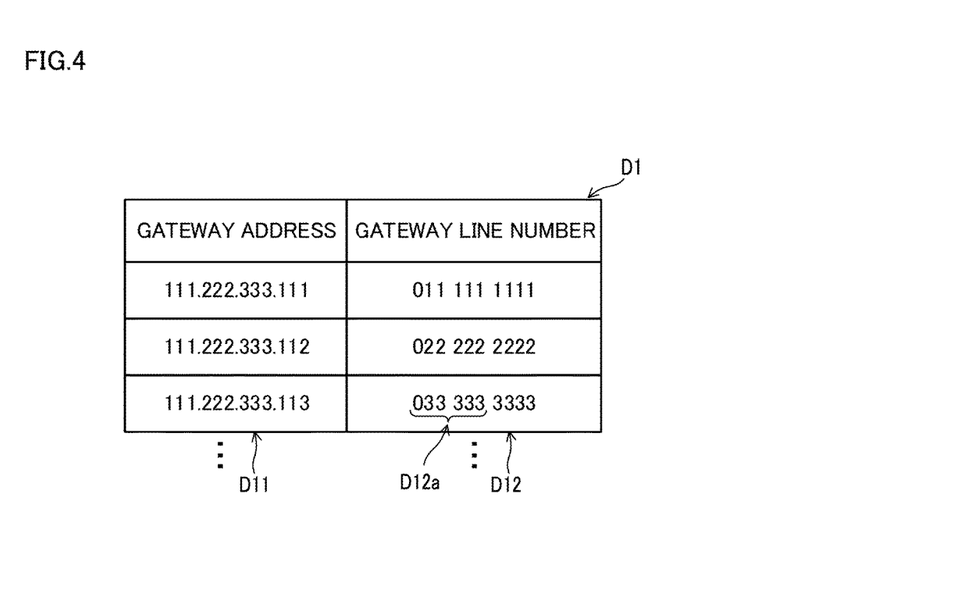
FIG. 4 is a diagram showing an example of a configuration of gateway data in the image forming apparatus according to the embodiment.

In step S103, the data acquiring portion 54G acquires gateway data D1 from the built-in storage 4. As shown in FIG. 4, the gateway data D1 includes a plurality of pairs of gateway address D11 and gateway line number D12.

A plurality of gateway addresses D11 in the gateway data D1 are network addresses of the plurality of FAX gateways 70 present on the WAN 80a. It is noted that in each of the plurality of first image forming apparatuses 10x that include the FAX gateway 70, the network address of that first image forming apparatus 10x itself serves as the gateway address D11.

Furthermore, a plurality of gateway line numbers D12 in the gateway data D1 are numbers of the public line 800 assigned to the plurality of FAX gateways 70 present on the WAN 80a.

The gateway data D1 is recorded in the built-in storage 4 of the plurality of first image forming apparatuses 10x during a gateway data registration process (see FIG. 3) that is described below. The data acquiring portion 54G executing the process of step S103 is an example of the gateway data acquiring portion.

It is noted that the gateway data D1 may be stored in a nonvolatile data storage device included in a shared server (not shown) provided in the network 80. In that case, in step S103, the data acquiring portion 54G acquires the gateway data D1 from the data storage device of the shared server via the communication device 6.

<Step S104>

Figure 5:
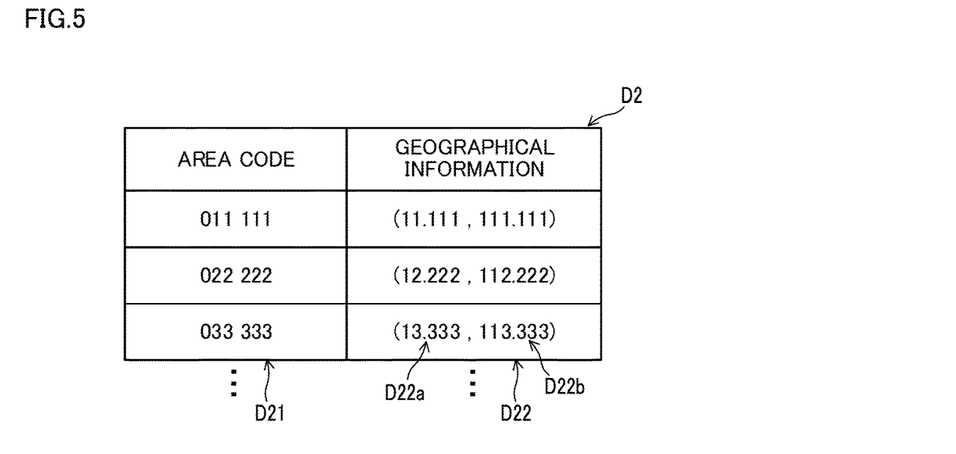
FIG. 5 is a diagram showing an example of a configuration of geographical data in the image forming apparatus according to the embodiment.

Furthermore, the data acquiring portion 54G acquires geographical correspondence data D2 from the built-in storage 4. As shown in FIG. 5, each piece of the geographical correspondence data D2 indicates a correspondence between geographical information D22 and an area code D21 that constitutes a part of a number of the public line 800. The data acquiring portion 54G executing the process of step S104 is an example of the geographical correspondence data acquiring portion.

For example, each piece of geographical information D22 may be composed of one or more pairs of longitude D22a and latitude D22b that correspond to one of the area codes D21 that are included in numbers of the public line 800. In the example shown in FIG. 5, each piece of geographical information D22 is composed of a pair of longitude D22a and latitude D22b that corresponds to one of the area codes D21. The pair of longitude D22a and latitude D22b, for each area code D21, corresponds to a representative position, such as a centroid position, of the region corresponding to that area code D21.

It is noted that each piece of the geographical information D22 may be composed of a plurality of pairs of longitude D22a and latitude D22b that correspond to positions of a plurality of vertices of a polygon enclosing the region corresponding to the area code D21.

<Step S105>

Next, the closest region identifying portion 54H executes a closest region identifying process. In the closest region identifying process, closest geographical information, namely a piece of geographical information D22, is identified from among a plurality of pieces of geographical information D22 in the geographical correspondence data D2 that correspond to area codes D12a of a plurality of gateway line numbers D12.

The closest geographical information is a piece of geographical information D22 that indicates a region that is closest to a region indicated by a piece of geographical information D22 in the geographical correspondence data D2 that corresponds to an area code of the destination line number D00 set in the FAX transmission data D0.

In the present embodiment, the closest region identifying portion 54H identifies the closest geographical information by comparing a plurality of distances from a plurality of points identified by a plurality of pairs of longitude D22a and latitude D22b of a plurality of pieces of geographical information D22 that are comparison objects.

In the geographical correspondence data D2, one area code D21 may correspond to a plurality of pairs of longitude D22a and latitude D22b. In that case, the closest region identifying portion 54H determines, as a distance between a point corresponding to the one area code D21 and the destination line number D00, the smallest distance among distances between a plurality of points corresponding to the one area code D21 and one or more points corresponding to the area code of the destination line number D00.

The area code D21 constituting a part of a number of the public line 800 is set in advance for each region such as a city, a town, or a village. A FAX gateway 70 to which a gateway line number D12 including an area code D21 corresponding to the closest geographical information has been assigned, is considered to be disposed closer to a region of the destination line number D00 than the other FAX gateways 70.

It is noted that in a case where the process of step S105 is executed by a first image forming apparatus 10x, a FAX gateway 70 corresponding to the closest geographical information is any of a FAX gateway 70 that is built in that first image forming apparatus 10x, or a FAX gateway 70 that is built in another first image forming apparatus 10x.

<Step S106>

Next, the FAX transmission requesting portion 54I transmits the FAX transmission data D0, via the WAN 80a, to a FAX gateway 70 to which a gateway address D11 corresponding to the closest geographical information has been assigned, and requests a FAX transmission to be performed via the public line 800 based on the FAX transmission data D0.

In the present embodiment, the transmission destination of the FAX transmission data D0 in step S106 is a first image forming apparatus 10x having a FAX gateway 70. The first image forming apparatus 10x may be an apparatus that executes the process of step S106.

In the first image forming apparatus 10x that has been requested to perform a FAX transmission, the FAX line transmission portion 54D of the FAX gateway 70 performs the FAX transmission via the public line 800 based on the received FAX transmission data D0, by controlling the modem 7.

After the process of step S106, the FAX transmission requesting portion 54I ends the FAX transmission process.

As described above, according to the present embodiment, the FAX transmission data D0 is transmitted from the FAX gateway 70 corresponding to the closest geographical information, to the communication partner apparatus to which the destination line number D00 has been assigned (S106). This makes it possible to reduce the fee to use the public line 800.

[Gateway Data Registration Process]

Next, an example of the procedure of the gateway data registration process is described with reference to the flowchart shown in FIG. 3.

Figure 3:
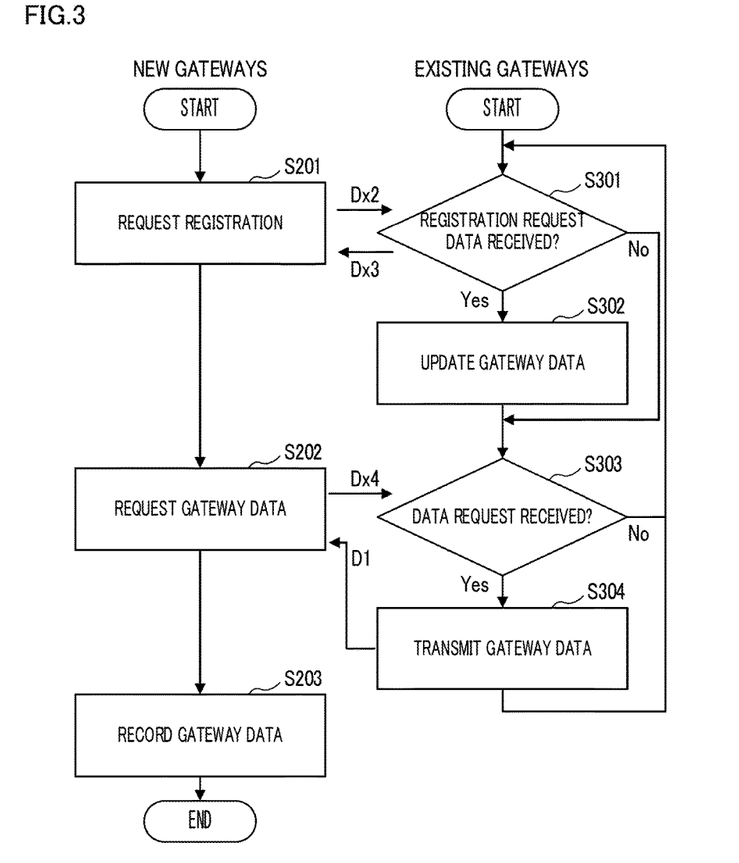
FIG. 3 is a flowchart showing an example of a procedure of a gateway data registration process in the image forming apparatus according to the embodiment.

The gateway data registration process shown in FIG. 3 is executed by a plurality of first image forming apparatuses 10x each of which includes the FAX gateway 70. More specifically, the gateway data registration process is executed by first image forming apparatuses 10x having new gateways that are FAX gateways 70 newly added on the WAN 80a, and by one or more first image forming apparatuses 10x having existing gateways that are FAX gateways 70 already present on the WAN 80a.

In a plurality of first image forming apparatuses 10x, the UI control portion 51 includes a gateway registration accepting portion 51B that executes a gateway registration accepting process. The gateway registration accepting portion 51B executes the gateway registration accepting process in the first image forming apparatuses 10x with the new gateways built therein.

In the gateway registration accepting process, the gateway registration accepting portion 51B sets gateway line numbers D12 assigned to the new gateways based on an operation performed by the user on the operation device 1a. Furthermore, the gateway registration accepting portion 51B starts the gateway data registration process.

On the other hand, when a first image forming apparatus 10x with an existing gateway built therein is activated, the gateway data registration portion 54C of the activated first image forming apparatus 10x starts the gateway data registration process.

In the following description, S201, S202, and S203 represent identification signs of the steps executed by the new gateways in the gateway data registration process. In addition, S301, S302, S303, and S304 represent identification signs of the steps executed by the existing gateways in the gateway data registration process.

<Step S201>

In the first image forming apparatuses 10x with the new gateways built therein, the registration request transmitting portion 54B performs, via the WAN 80a, a broadcast transmission of registration request data Dx2 that includes the gateway address D11 and the gateway line number D12 of the new gateway.

Furthermore, the registration request transmitting portion 54B receives response data Dx3 from existing gateways that received the registration request data Dx2. The response data Dx3 includes gateway address D11 of the existing gateways that received the registration request data Dx2.

<Step S202>

Next, the registration request transmitting portion 54B transmits, via the WAN 80a, gateway data request command Dx4 to one of the transmission sources of the response data Dx3. Furthermore, the registration request transmitting portion 54B receives the gateway data D1 from the transmission sources of the gateway data request command Dx4.

As described above, the gateway data D1 includes a plurality of pairs of gateway address D11 and gateway line number D12 of a plurality of FAX gateways 70 (see FIG. 4).

<Step S203>

Next, the gateway data registration portion 54C records the gateway data D1 obtained in step S202, to the built-in storage 4. After this, the gateway data registration portion 54C ends the gateway data registration process in the first image forming apparatuses 10x with new gateways built therein.

<Step S301>

On the other hand, in all the first image forming apparatuses 10x with existing gateways built therein, the gateway data registration portion 54C executes a process to receive the registration request data Dx2 that has been transmitted by the broadcast transmission in step S201.

In a case where the registration request data Dx2 has not been received, the gateway data registration portion 54C moves the process to step S303. In addition, in a case where the registration request data Dx2 has been received, the gateway data registration portion 54C moves the process to step S302.

<Step S302>

In step S302, the gateway data registration portion 54C adds gateway address D11 and gateway line number D12 of the new gateway included in the registration request data Dx2, to the gateway data D1 stored in the built-in storage 4. This allows the gateway data D1 to be updated to include information of the new gateway.

After completion of the process of step S302, the gateway data registration portion 54C moves the process to step S303. The processes of steps S301 and S302 are executed each time a new gateway is added. Accordingly, the gateway data registration portion 54C receives the registration request data Dx2 from a plurality of FAX gateways 70 via the WAN 80a (S301). Furthermore, the gateway data registration portion 54C stores the gateway address D11 and the gateway line number D12 included in the received registration request data Dx2, into the built-in storage 4 as a part of the gateway data D1 (S302).

<Step S303>

In step S303, the gateway data registration portion 54C executes a process to receive the gateway data request command Dx4 from the first image forming apparatuses 10x that have the new gateways built therein.

In step S303, in a case where the gateway data request command Dx4 has not been received, the gateway data registration portion 54C moves the process to step S301. In addition, in a case where the gateway data request command Dx4 has been received, the gateway data registration portion 54C moves the process to step S304.

<Step S304>

In step S304, the gateway data registration portion 54C transmits the gateway data D1 stored in the built-in storage 4, to the transmission source of the gateway data request command Dx4. After this, the gateway data registration portion 54C moves the process to step S301.

As described above, the gateway data registration portion 54C receives the registration request data Dx2 from each of the plurality of FAX gateways 70 via the WAN 80a, and stores the gateway address D11 and the gateway line number D12 included in the received registration request data Dx2, into the built-in storage 4 as a part of the gateway data D1 (S301, S302).

Accordingly, in one or more first image forming apparatuses 10x having the existing gateways, time and effort to perform an operation to add the data of the new gateways to the gateway data D1 are eliminated.

In addition, the registration request transmitting portion 54B performs a broadcast transmission of registration request data Dx2 that includes the gateway address D11 and the gateway line number D12 of the FAX gateway 70 that is built in its associated apparatus (S201).

Accordingly, in the first image forming apparatuses 10x having the existing gateways, there is no need to identify each of existing first image forming apparatuses 10x and transmit the registration request data Dx2.

Application Examples

In the above-described image forming apparatus 10, in a case where the destination line number D00 is a line number of an overseas nation, the FAX accepting portion 51A may restricts a transmission of the FAX transmission data D0.

For example, only when a password registered in advance is input via the operation device 1a, the FAX accepting portion 51A may allow a transmission of the FAX transmission data D0.

In addition, in a case where the destination line number D00 is a line number of an overseas nation, the closest region identifying portion 54H may identify a gateway address D11 that has been set in advance for transmission to overseas nations, as the closest geographical information.

It is noted that the network facsimile apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A network facsimile apparatus comprising:
   a communication device configured to communicate with another apparatus via a network; and
   a processor configured to:
   generate FAX transmission data in which a destination line number of a public line is set;
   acquire gateway data from a nonvolatile storage device, the gateway data including a plurality of pairs of gateway address and gateway line number, the plurality of pairs of gateway address and gateway line number respectively corresponding to a plurality of FAX gateways, the gateway address being a network address of a corresponding one of the plurality of FAX gateways, the gateway line number being a line number of the public line of the corresponding one of the plurality of FAX gateways;
   a acquire geographical correspondence data from the nonvolatile storage device, each piece of the geographical correspondence data indicating a correspondence between geographical information and an area code that constitutes a part of the line number of the public line;
   identify, as closest geographical information, a piece of the geographical information from among a plurality of pieces of the geographical information in the geographical correspondence data corresponding to area codes of a plurality of gateway line numbers, the closest geographical information indicating a region that is closest to a region indicated by a piece of the geographical information in the geographical correspondence data that corresponds to an area code of the destination line number set in the FAX transmission data; and
   transmit the FAX transmission data, via the network, to a FAX gateway to which a gateway address corresponding to the closest geographical information has been assigned, and request a FAX transmission to be performed via the public line based on the FAX transmission data, wherein each piece of the geographical information is composed of one or more pairs of a longitude and a latitude that correspond to one of the area codes that are included in the line number of the public line;
   identify the closest geographical information by comparing a plurality of distances between a plurality of points identified by the plurality of pieces of the geographical information that are comparison objects; and
   in a case where, in each piece of the geographical correspondence data, an area code of a gateway line number corresponds to a plurality of pairs of a longitude and a latitude, determine, as a distance between a region corresponding to the area code of the gateway line number and a region corresponding to the area code of the destination line number, the smallest distance among a plurality of distances between:
   a plurality of points corresponding to the area code of the gateway line number, and
   one or more points corresponding to the area code of the destination line number.

2. The network facsimile apparatus according to claim 1, further comprising:
   a computer-readable nonvolatile built-in storage, wherein
   the processor is further configured to:
   receive registration request data that includes a new gateway address and a new gateway line number from a new FAX gateway via the communication device, and store gateway addresses and gateway line numbers included in the received registration request data, into the built-in storage as a part of the gateway data, and
   acquire the gateway data from the built-in storage.

3. The network facsimile apparatus according to claim 2, further comprising:
   a built-in FAX gateway which is one of the plurality of FAX gateways, wherein
   the processor is further configured to:
   perform, via the network, a broadcast transmission of registration request data that includes the new gateway address and the new gateway line number corresponding to the built-in FAX gateway.

4. The network facsimile apparatus according to claim 1, wherein
   the processor is further configured to:
   request, via the network, a registered network address corresponding to the destination line number set in the FAX transmission data, to a predetermined management server, and receive the registered network address from the management server; and
   transmit, via the network, the FAX transmission data in which the registered network address obtained from the management server is set as a destination
   in a case where the registered network address is not obtained from the management server, identify the closest geographical information.

5. The network facsimile apparatus according to claim 1, wherein
   the processor is further configured to:
   in a case where the destination line number is a line number of a foreign nation, identify a gateway address that has been set in advance for transmission to foreign nations as the closest geographical information.

* * * * *